Figure 2:
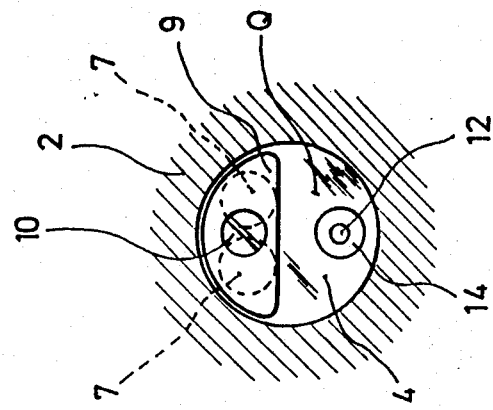

United States Patent [19]

Brunner

[11] Patent Number: 4,733,690

[45] Date of Patent: Mar. 29, 1988

[54] HYDRAULIC VALVE

[76] Inventor: Rudolf Brunner, Wankstrasse 23, D-8011 Baldham, Fed. Rep. of Germany

[21] Appl. No.: 861,748

[22] Filed: May 8, 1986

Related U.S. Application Data

[63] Continuation of Ser. No. 742,329, Jun. 7, 1985, abandoned.

[30] Foreign Application Priority Data

Jun. 15, 1984 [EP] European Pat. Off. ......... 84106877.8

[51] Int. Cl.$^4$ ............................................. F16K 15/02
[52] U.S. Cl. .............................. 137/513.7; 137/516.11
[58] Field of Search .......................... 137/513.7, 516.11

[56] References Cited

U.S. PATENT DOCUMENTS

| | | | |
|---|---|---|---|
| 573,342 | 12/1896 | Miller | 137/513.7 |
| 1,670,318 | 5/1928 | Shaff | 137/513.7 X |
| 1,745,304 | 1/1930 | Lemex | 137/513.7 |
| 2,214,290 | 9/1940 | Ward | 137/513.7 |
| 2,893,432 | 7/1959 | Gibson | 137/513.7 X |
| 4,030,520 | 6/1977 | Sands | 137/513.7 X |

Primary Examiner—Robert G. Nilson

[57] ABSTRACT

The invention relates to a hydraulic valve having a housing (2, 2', 2") in which a housing partition formed with at least one passage (7) therethrough is provided between an inlet bore (3) and an outlet bore (4) aligned therewith, said passage having associated therewith a valve seat for a non-return valve element (9) adapted to close in one flow direction, said housing containing at least one flow channel (11) bypassing said passage for performing at least one further valve function. Known hydraulic valves of this type are either of excessive dimensions transversely of the flow direction and composed of several parts, or are of excessive length in the flow direction. According to the invention there is provided a compact hydraulic valve of inexpensive construction and composed of a reduced number of parts, such valve being characterized in that said flow channel (11) for said further valve function is formed in said housing partition together with said passage (7) and substantially within the cross-sectional area (Q) of said housing defined by the aligned bores (3, 4).

6 Claims, 5 Drawing Figures

HYDRAULIC VALVE

This is a continuation of application Ser. No. 742,329, filed June 7, 1985, now abandoned.

DESCRIPTION

The present invention relates to a hydraulic valve of the type defined in the generic clause of patent claim 1.

Hydraulic valves of this type have been known for decades. In these valves, the further valve function is a restricted flow-through in the flow direction blocked by the non-return valve, the flow channel bypassing the passage being located outside the cross-sectional area of the housing as defined by the aligned inlet and outlet bores. To this purpose it was necessary to increase the dimensions of the housing transversely of the flow direction at the location of the flow channel, or to secure a dome-shaped component to the outside of the housing. This was in profound contradiction to the general effort to minimize the dimensions of such hydraulic valves transversely of the flow direction within the limits defined by the size of the pipe connection fittings in the inlet and outlet bores. In addition, the further valve function, i.e. the bypassing flow channel, required a rather complicated and thus expensive construction effort. There was moreover a deflection of the flow within the bypassing flow channel which was highly undesirable for certain operating conditions.

In the case of so-called flow control valves as described for instance in U.S. Pat. No. 3,120,243, it is known to dispose the valve elements for two valve functions associated to one and the same flow direction one behind the other in the flow direction so as to obtain the smallest possible housing dimensions transversely of the flow direction. This results, however, in an excessive length of the valve and in the disadvantage that the two valve functions affect one another in each flow direction.

It is an object of the present invention to provide a hydraulic valve of the type defined in the introduction, which is characterized by a simple construction and a compact housing structure, and wherein the two valve functions are prevented from affecting one another.

This object is attained according to the invention by the characteristics set forth in the characterizing clause of patent claim 1.

As the flow channel and the passage are both located within the cross-sectional area determined by the size of the aligned bores, the housing dimensions transversely of the flow direction is solely determined by the size of the bores, resulting in a compact housing structure. The construction effort for providing the flow channel is small, as the flow channel, similar to the passage, is simply disposed in the housing partition or extends thereinto. Since the passage and the flow channel are disposed substantially parallel to one another, and not one behind the other in the flow direction, the two valve functions are prevented from affecting one another. The construction of the hydraulic valve is based on the perception that the size of the inlet and outlet bores is in most cases substantially greater than would be required for a single valve function, so that it should be admissible to accommodate a flow channel for at least one further valve function parallel to the passage within the given cross-sectional area of the housing partition without having to fear any harmful interference of the two valve functions with one another.

An advantageous embodiment is one wherein the pipe connection fittings are of a certain minimum size for ensuring a proper sealing function also at high pressures and for permitting them to be readily handled, the dimensions of the housing being determined in the last consequence by this size. The size of the housing is thus indirectly dependent on that of the fittings, and permits the flow paths of two essentially independent valve functions to be accommodated parallel to one another without substantial construction effort and without having to increase the dimensions of the housing.

A further advantageous embodiment is one wherein the flow channel is so to speak tapped, or formed by a communicating flow channel branched off the flow path for the first valve function. The communication flow channel may be used for a separate pilot function or for a pressure supply to the hydraulic valve in the closed state of the non-return valve.

A further practical embodiment, is one in which the further valve function is that of a throttle valve for restricted through-flow in the flow direction blocked by the non-return valve. The main flow through the valve is blocked in a given flow direction by the non-return valve. The valve then permits only a restricted flow therethrough in the respective direction the magnitude of this flow being determined by the throttling action in the restricted passage. The flow channel may also be used for measuring pressure and flow rate therein. It is further conceivable to dispose a switch element in the flow channel for generating a signal indicative of the closed state of the non-return valve. As long as the non-return valve is in its open state, the flow through the restricted passage is of no importance. In its closed state, on the other hand, the non-return valve does not affect the flow through the restricted passage.

A further advantageous embodiment is one according to which there is provided a throttling member projecting into the flow channel and adapted to be adjusted for varying the throttling effect. This embodiment permits the further valve function to be varied by suitably adjusting the throttling member. The flow through the open non-return valve or the blocked flow in the closed state of the non-return valve are not—or only to a predetermined degree—affected by the further valve function. The housing partition has to accommodate a relatively long guide bore, resulting on the one hand in a wide adjustment range for the throttling member, and on the other, in the avoidance of any substantial increase of the size of the housing transversely of the flow direction. In this embodiment the size of the housing is thus not either determined by the valve functions, but essentially only by the size of the aligned bores in which the pipe connection fittings are received.

Particularly advantageous is an embodiment in which the major portion of the length of the actuating shaft is accommodated in the housing partition, so that the outer adjustment means may be disposed closely to the exterior of the housing and the hydraulic valve may be of a compact overall construction.

That portion of the limited cross-sectional area of the housing partition reserved for the non-return valve function is particularly well utilized in an embodiment wherein the passage may be formed by more than two bores. For the fillet forming the valve element it is sufficient to just overlie the openings of the bores in order to achieve a satisfactory non-return function, the remainder of the limited cross-sectional area being left free for the further valve function.

A structurally simple embodiment capable of reliable operation over extended periods of time is one in which, in the closed position of the non-return valve with the fillet effective to reliably seal the passage, the remainder of the limited cross-sectional area may be used to advantage to accommodate the relatively strong flow occurring in the open state of the non-return valve.

In a further important embodiment, the guide element is imparted with an additional function in that it prevents the throttling member from being inadvertently adjusted to an excessive degree. This permits to do without additional provisions usually required for this purpose.

A further advantageous embodiment is one resulting in a pressure-compensation taking place between the bores of the passages, and in the elimination of any dead volume in the guide bore in which otherwise a pressure build-up might occur which would interfere with the adjustment displacements of the throttling member. If at least one bore of the passage intersects the guide bore, any working medium leaking from the flow channel past the throttling member will be drained off in a simple and desirable manner.

A further advantageous embodiment is one effective to achieve a pressure drop in two stages, thus eliminating the disadvantage of the development of strong noises frequently encountered in prior art in the case of high operating pressures and high flow rates. The first pressure drop stage is effective to dissipate a considerable proportion of the overall pressure to be dissipated, and that in opposition to the counterpressure of the secodn pressure drop stage, so that the latter is effective to produce an efficient dampening action, while the second pressure drop stage dissipates only a residual pressure without the generation of noise and cavitation phenomena.

A further advantageous embodiment is achieved by tappping of the guide bore in a described manner when either permits the latter to supply an auxiliary control pressure, or to communicate the pressure conditions prevailing in the second valve function to a monitoring device. It would also be conceivable to employ the communication flow channel for an additional pressure supply.

In another embodiment a pressure equilibration to be readily achieved over the actuating shaft or the throttling member, respectively, so as to facilitate adjustment thereof.

A particularly simple embodiment is one in which the desired throttling effect is adjusted by simple rotation of the throttling member. The sealing between the threads is sufficient for effective operation of the second valve function. Any leaking working medium will be drained by way of the passage.

Figure 1:
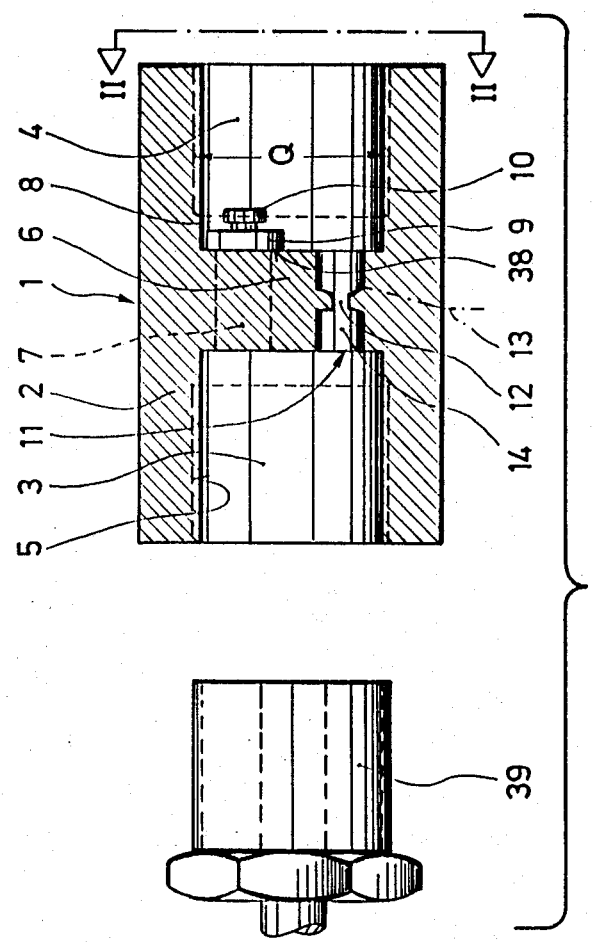
Figure 3:
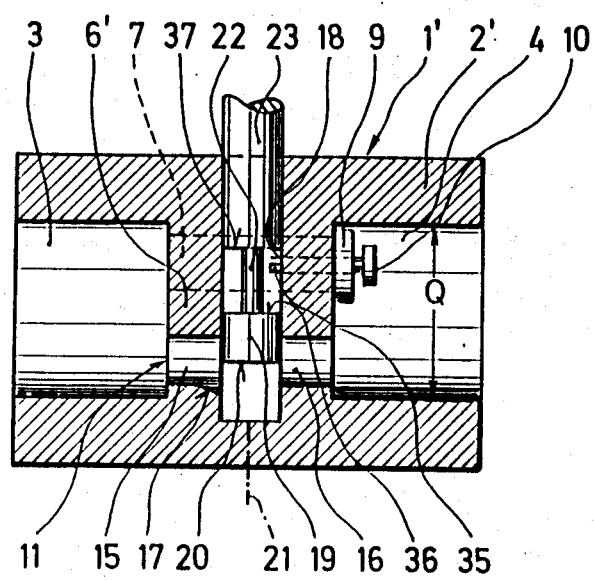
Figure 4:
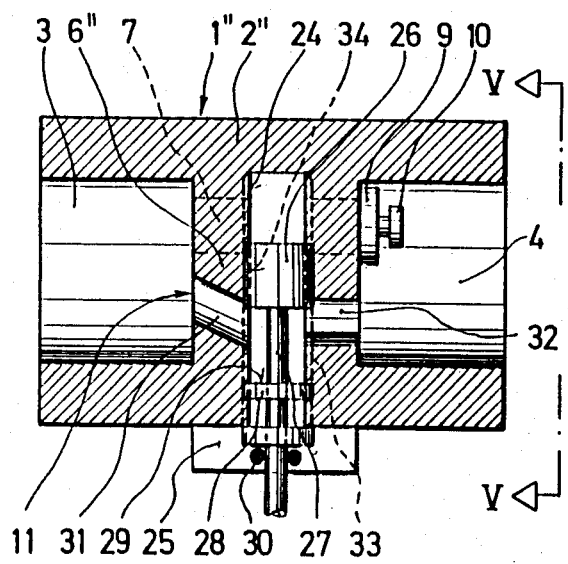
Figure 5:
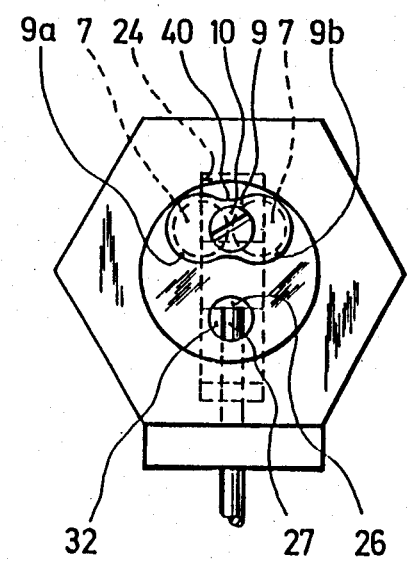

Embodiments of the invention shall now be described by way of example with reference to the accompanying drawings, wherein:

FIG. 1 shows a longitudinal sectional view of a hydraulic valve in a first embodiment of the invention, FIG. 2 shows a view of the embodiment of FIG 1 in the direction of arrows II—II in FIG. 1, FIG. 3 shows a longitudinal sectional view of a second embodiment of the hydraulic valve, FIG. 4 shows a longitudinal sectional view of a third embodiment of a hydraulic valve according to the invention, and FIG. 5 shows an end view of the FIG. 4 embodiment in the direction of arrows V—V.

As shown in FIGS. 1 and 2, a hydraulic valve 1 has a housing 2 formed with an inlet bore 3 and an outlet bore 4 aligned therewith. Bores 3 and 4 are formed as blind bores extending in the longitudinal direction of the housing, and separated from one another by a partition 6 formed within housing 2. Each bore 3 and 4 has interior threads 5 for the engagement of a pipe connector fitting 39, and defines a cross-sectional area Q.

The hydraulic valve 1 has two functions, namely, a non-return function and a throttling function. As particularly shown in FIG. 2, partition 6 is formed with two spaced bores located above the center plane of cross-sectional area Q and cooperating to form a passage 7. In outlet bore 4 there is provided a non-return valve 8 consisting of a fillet-shaped non-return valve element 9 and a guide element 10 for movably guiding element 9 and secured in housing partition 6. In the embodiment shown, non-return valve element 9 is of semicircular configuration and adapted to cover both bores of passage 7. It cooperates with valve seats 38 formed in partition 6. Guide element 10 may be a simple headed screw 10 guiding non-return valve element 9 in an essentially rotatable and displaceable manner. By engagement with the interior wall surface of outlet bore 4 non-return valve element 9 is automatically retained in the position shown in FIG. 2.

Provided in the lower half of cross-sectional area Q is a flow channel 11 bypassing passage 7 and formed as an open-ended bore 14 having a restricted or throttling passage 12 therein. Adjacent to restricted passage 12 on the side thereof facing towards outlet bore 4 there is provided a communication flow channel opening into bore 14 as shown by dash-dotted lines in FIG. 1 at 13.

The housing may be formed as a block of quadrangular, circular or hexangular cross-sectional shape. A spring may be disposed between the head of guide element 10 and non-return valve element 9. The shaft of guide element 10 may be of non-circular shape so as to secute non-return valve element 9 against rotation.

In FIG. 1, the flow through hydraulic valve 1 in the direction from inlet bore 3 to outlet bore 4 is essentially not restricted, as non-return valve element 9 is lifted off valve seat 38, permitting the flow to pass through the lower part of cross-sectional area Q. At this instance, a certain flow also passes through flow channel 14, 12, although merely to a negligible degree. The restricted passage 12, FIG. 1, is formed by reducing or necking down the diameter of the flow channnge 11.

In the case of a fluid flow in the opposite direction, non-return valve element 9 is engaged with valve seat 38 so as to block the flow in this direction. There is now only a reduced flow through flow channel 14 and restricted passage 12.

In both directions of flow communication flow channel 13 may be used to draw off an auxiliary control pressure. Communication flow channel 13 may also be used to sense the pressure prevailing adjacent outlet bore 4. Likewise, restricted passage 12 might be replaced by a flow rate sensor or a switching element. In this manner, constructive provisions have been made for two separate valve functions within the cross-sectional area Q defined by bores 3 and 4. The left-hand portion of flow channel 14 in FIG. 1 might be closed, so that in the closed position of non-return valve 8, a fluid flow occurring in the blocked flow direction would directly enter communication flow channel 13. It is further conceivable to employ communication flow channel 13 for feedign additional working fluid to the system.

FIG. 3 shows a second embodiment of the hydraulic valve 1', in which a throttling function is provided as the second function in addition to the non-return function. In this case, the flow channel 11 formed in housing 2', or in partition 6', respectively, and bypassing passage 7 consists of two aligned bores 15, 16 lying within cross-sectional area Q. Bores 15 and 16 are intersected by a guide bore 18 for a cylindrical throttling member 19 extending into partition 6' from the top of the housing. The opening of bore 15 into guide bore 18 is formed as an enlarged section 17 the purpose of which is to be explained below. Throttling member 19 has a planar end face 20 and is connected to an actuating shaft 22 having an enlarged-diameter portion 23 extending out of housing 2'. The two bores of passage 7 may intersect guide bore 18 or may pass outside the range thereof. A communication flow channel 21 opens into the lower end of guide bore 18. Guide element 10 is formed with a stop member 35 projecting into guide bore 18 and cooperating with stop formations 37 and 36 formed on portion 23 of actuating shaft 22 and throttling member 19, respectively, in the end positions of the latter. The throttling effect of flow channel 11 may be varied by displacing throttling member 19 by means of actuating shaft 22. The farther throttling member 19 is displaced downwards in FIG. 3, the stronger is the throttling effect brough about between bores 3 and 4 in two pressure drop stages. In this manner the overall pressure to be dissipated is reduced in two stages, resulting in the suppression of annoying noise in operation. The widened section 17 of bore 15 has the effect that the pressure drop between end face 20 and bore 15 is less than the pressure drop occurring between end face 20 and bore 16. As a result, the major portion of the pressure to be reduced is dissipated in the first pressure drop stage, and the smaller portion in the second pressure drop stage between end face 20 and bore 15, as the fluid flows from bore 4 towards bore 3.

Bore 15 could also be closed, in which case communication flow channel 21 would communicate with bore 4 through a pressure drop stage, so that in the closed state of the non-return valve a restricted fluid flow would enter communication flow channel 21 from bore 4 or vice versa.

In the embodiment of FIGS. 4 and 5, non-return valve member 9 is of a butterfly-shaped configuration, consisting of two substantially circular lobes 9a and 9b interconnected by a central portion 40 through which guide element 10 extends. Non-return valve element 9 is prevented from rotary displacement by the interior wall surface of bore 4. A blind bore acting as a guide bore 24 extends into housing partition 6'' from the side of housing 2'' of hydraulic valve 1'' facing away from passage 7, as particularly shown in FIG. 4. The bores forming passage 7 should preferably intersect guide bore 24. Secured to the open end of guide bore 24 is a cover 25 through which an actuating shaft 27 for a cylindrical throttling member 26 extends outwards of the housing for actuation by means of a turning knob or the like. At a spaced position from throttling member 26, shaft 27 carries a flange member 28 having a pressure compensating end face facing towards throttling member 26. Guide bore 24 is formed with female threads 33 for engagement with male threads 34 on throttling member 26, so that the latter may be adjusted within guide bore 24 by rotating shaft 27.

In this embodiment, the flow channel 11 bypassing passage 7 is formed by an oblique bore 31 and an axial bore 32, the openings of which into guide bore 24 are offset relative to one another in the adjustment direction of throttling member 26. As a result, throttling member 26 cooperates with bores 31 and 32 to form two pressure drop stages in which the fluid flow is throttled to a different degree, the throttling effect being stronger between bore 32 and guide bore 24 than between guide bore 24 and bore 31. The pressure biasing throttling member 26 upwards in FIG. 4 at the same time acts on pressure compensation end face 29, so that adjustment of throttling member 26 may be carried out under pressure equilibrium conditions.

Also in the last-described embodiment it would be possible to eliminate one of bores 31 or 32 and to provide a communication flow channel (as indicated at 121 in FIG. 3) so as to establish a separate flow path for the further valve function.

I claim:

1. A hydraulic valve having a housing (2, 2', 2'') in which a housing partition (6, 6', 6'') formed with a passage means (7) therethrough is provided between an inlet bore (3) and an outlet bore (4) aligned therewith, said passage means having associated therewith a valve seat for a non-return flap valve element (9) adapted to close in one flow direction, said housing containing at least one flow channel (11) bypassing said passage means for performing at least one further valve function, characterized in that to afford ample space for several valve functions without affecting one another, said flow channel (11) for said further valve function is eccentrically located on one side of said housing partition (6, 6a, 6'') while said passage means (7) is eccentrically located on the other side of said housing partition, both eccentric positions being within the cross-sectional area (Q) of said housing defined by the aligned bores (3, 4), further characterized in that within said flow channel (11) is located a means (12, 19, 26) effecting throttling action therein in the direction of flow blocked by said non-return valve, and further characterized in that said flap valve element occupies not more than half of the cross-sectional area (Q).

2. A hydraulic valve according to claim 1, characterized in that said housing (2, 2') contains a communication flow channel (13, 21) communicating with said flow channel (11) within said housing partition (6, 6') or forming a part thereof.

3. A hydraulic valve according to claim 1 characterized in that within said flow channel (11) is a restricted passage 12.

4. A hydraulic valve according to claim 1 in that said passage means includes two parallel passages (7,7), and in which the valve element is guided by a screw (10) with the head of the screw limiting displacement of the valve element in the direction of flow through said passage means.

5. A hydraulic valve according to claim 4 wherein the two passages (7,7) are positioned immediately adjacent the side wall of one of the bores (3,4), and said valve element in size being restricted to substantially a mere complement of the area of the partition occupied by said passages (7,7) so that the remaining area of said partition may be devoted to said additional valve function.

6. A hydraulic valve according to claim 1 in which the passage means includes two parallel passages (7,7) in the housing partition with each passage immediately adjacent the side wall of one of the bores (3,4), and said valve element in size being restricted to substantially a mere complement of the area of the partition occupied by said passages (7,7) so that the remaining area of said partition may be devoted to said addition valve function.

* * * * *